United States Patent

Pichon et al.

[11] Patent Number: 6,106,920
[45] Date of Patent: Aug. 22, 2000

[54] AUTOMOBILE VEHICLE ELEMENT INCLUDING A FLOCK COATING AND FLOCKING PROCESS FOR SUCH AN ELEMENT

[75] Inventors: Hugues Pichon, Morigny; Jean-Marc Petra, Etampes, both of France

[73] Assignee: Bertrand Faure Equipements S.A., Boulogne Cedex, France

[21] Appl. No.: 09/127,623

[22] Filed: Aug. 3, 1998

[30] Foreign Application Priority Data

Aug. 5, 1997 [FR] France ................................. 97 10178

[51] Int. Cl.⁷ ............................. B32B 33/00; B05D 1/14
[52] U.S. Cl. ................................................. 428/90; 428/95
[58] Field of Search .............................. 428/90, 95

[56] References Cited

U.S. PATENT DOCUMENTS

| | | |
|---|---|---|
| 2,791,268 | 5/1957 | Mendelsohn . |
| 3,979,487 | 9/1976 | Squier et al. ............................. 264/24 |
| 4,362,773 | 12/1982 | Shikinami ................................. 428/90 |
| 4,377,610 | 3/1983 | McClung et al. ......................... 428/88 |
| 4,421,809 | 12/1983 | Bish et al. ................................ 428/90 |
| 4,482,593 | 11/1984 | Sagel et al. .............................. 428/90 |
| 4,857,377 | 8/1989 | Daimon et al. ........................... 428/90 |

FOREIGN PATENT DOCUMENTS

| | | |
|---|---|---|
| 2 188 430 | 2/1974 | France . |
| 2 442 721 | 8/1980 | France . |
| 2 708 843 | 2/1995 | France . |
| 1 920 529 | 10/1970 | Germany . |
| 44 01 417 | 7/1994 | Germany . |
| 2277441 | 11/1994 | United Kingdom . |

*Primary Examiner*—Terrel Morris
*Assistant Examiner*—Cheryl Juska
*Attorney, Agent, or Firm*—Pollock, Vande Sande & Amernick

[57] ABSTRACT

The flocking process for an automobile vehicle element according to which adhesive is applied to the surface of a body (1, 11, 21) of the said element then flock (6) projected onto the surface to which the adhesive has been applied is characterised in that, before applying adhesive, the surface of the body is covered with a fine textile web (2, 12, 22). Especially applicable for the manufacture of automobile vehicle seat elements including a synthetic foam body and a flock coating.

3 Claims, 2 Drawing Sheets

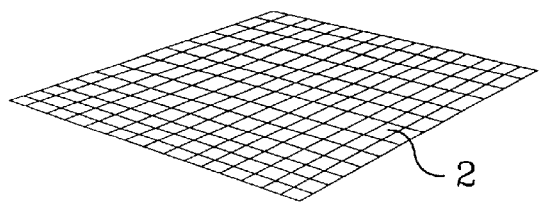
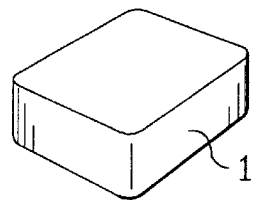
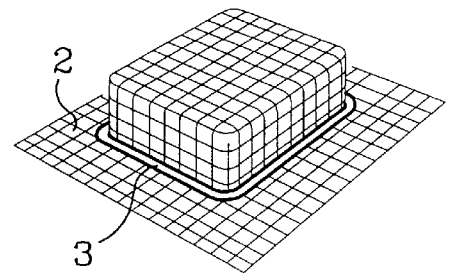
FIG.1
FIG.2
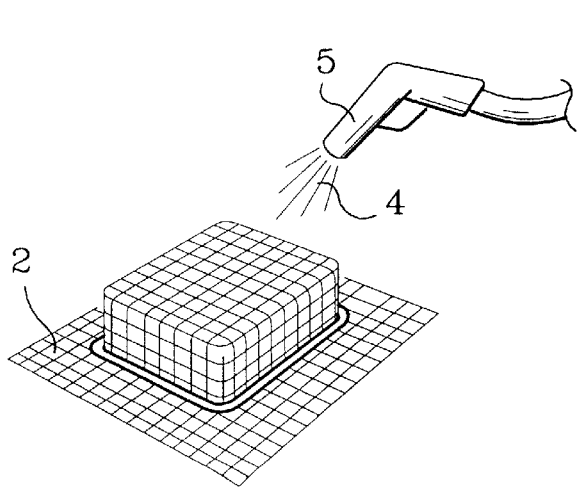
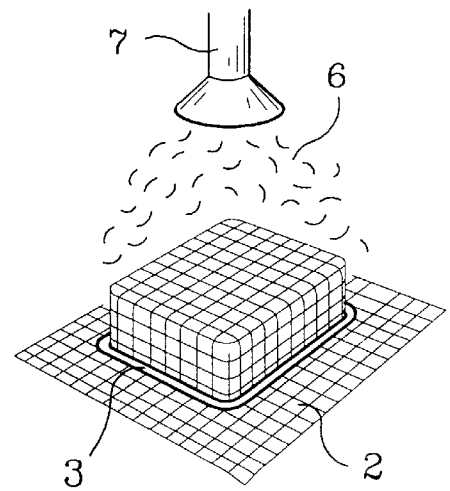
FIG.3
FIG.4

AUTOMOBILE VEHICLE ELEMENT INCLUDING A FLOCK COATING AND FLOCKING PROCESS FOR SUCH AN ELEMENT

FIELD OF THE INVENTION

This invention concerns the making of coatings on elements inside automobile vehicles by the flocking technique. Such coatings can be used in particular for seat elements, such as the seating parts or the backrests, armrests, headrests, or simply a part of these elements, but also for other elements inside cars such as certain walls of the passenger compartment or the dashboard for example.

BACKGROUND OF THE INVENTION

It is recalled that, generally, the flocking technique consists in applying to an adhesive support fibres of varying lengths made of a material such as wool, cotton or synthetic fibres, called flock. The support thus coated has a velvety appearance resulting from the general orientation of the fibres perpendicular is to the surface of the support. A known flocking process consists in applying an adhesive layer to the support onto which the fibres are deposited by means of a flock distributor, the distribution of the fibres being obtained thanks to the creation of an electric field between the said distributor and the support, this field ensuring the attraction of the fibres towards the support and their anchoring on the adhesive layer with the required orientation.

A process for flocking fragile supports, such as the cutout or moulded foam paddings intended for furniture or for automobiles, according to which the surface resistance of these supports is reinforced by an intermediary layer of elastomer material, where this intermediary layer can itself include the adhesive for the flocking fibres, is already known especially by documents FR-A-2708843, FR-A-2709050 and FR-A-2709051. The aim of this process is to give the flocked product better resistance to abrasion and to tearing and to improve the surface finish especially in the case of a cutout or moulded foam support the surface of which can be grainy or have bumps. It also aims at enabling the flocking of sculpted surfaces or surfaces with protruding or recessed shapes.

BRIEF DESCRIPTION OF THE INVENTION

This invention aims at obtaining the same results but at lower costs and using a simpler process and also aims at obtaining a specific finish on the flocked surface.

With these targets in mind, the subject of the invention is an automobile vehicle element with a body and a flocked outer coating, the said coating consisting of flock held onto the surface of the body by an adhesive film characterised in that it includes a fine textile web covering the said surface and adhering to it and the flock covers the said textile web.

This web can be a knitted or woven or unwoven textile capable of mating with the three-dimensional shapes of the surface by localised stretching. Typically, a synthetic material textile will be used such as polyamide or polyester for example.

The invention especially applies to the flocking of parts the body of which is made of a deformable, compressible material such as, for example, synthetic foam, moulded or cutout flexible polyurethane foam or polyester fibres, latexed horse hair, or any other foam, cellular or not. In these applications, a specific advantage of the textile web is that it reinforces the resistance of the part, especially its resistance to tearing, whilst conserving its original flexibility. Indeed, the above mentioned foams, currently used for example as padding for seats, have the disadvantage of tearing relatively easily when they are subjected to forces, such as those which can be exerted on the surface by a localised load, for example under the weight of the user of the seat or simply by the frictions which can be produced when the user moves. This is one of the reasons for which these paddings or upholsteries are conventionally covered with a fabric, velvet, leather or similar finish coating. The application of such coatings is sometimes tricky as the coating must be held on the padding which requires either the use of systems attaching the coating to the framework of the seat or the bonding of the coating onto the foam padding. Also, the preparation of these coatings requires cutting and sewing operations to give them a suitable form to cover the various elements of the seat. All this leads therefore to non-negligible costs. This invention enables these costs to be reduced by making the finish coating of these seat elements by flocking without however reducing resistance thanks to the reinforcement provided by the textile web the fibres of which, extending globally parallel to the surface and adhering to it, limit risks of incipient tears.

Also, this web, which is stretched over the part, flattens out the small surface defects of the paddings such as the bumps obtained when cutting the blocks of foam or the hollows resulting from bubbles generated during moulding.

Although this invention is therefore especially advantageous for the flocking of parts made of relatively flexible foam, it can also be used for stiffer parts such as upholstery made of rigid foam or other materials conventionally used for example for lateral side parts of the seats, door frames, or any other element inside the car liable to receive a coating with a velvety finish.

Whatever the case, the textile web also gives the flocked surface a texture corresponding to that of the web used, for example a screened finish when the web is made of a woven material.

Preferably, the textile web is attached to the surface of the flocked element by an adhesive which also retains the flock. The web thus forms a sort of armature closely bonded to the film of adhesive and therefore both to the body of the element and to the flock fibres and this by performing only a single adhesive application operation.

The subject of the invention is also a flocking process for an automobile vehicle element, according to which adhesive is applied to the surface of the body of the said element then the flock is projected onto the surface to which the adhesive has been applied, this process being characterised in that, before applying the adhesive, the surface of the body is coated with a fine textile web.

According to a specific arrangement, the textile web is held stretched over the surface by tensioning strips forming a frame around the contours of the surface to be flocked.

According to another specific arrangement, intended for flocking elements with a ring-shaped body, a tubular textile web is used and placed into the hole of the body and then folded over around the peripheral surface of the said body.

According to yet another arrangement, for flocking elements with a body with convex contours, the textile web is attached to a frame greater in size than that of the surface to be flocked and the web is applied to the surface of the body by pushing the frame around the body.

Other features and advantages will appear in the description which will be given of the various flocking process methods according to the invention adapted to suit the shapes of the elements to be coated.

BRIEF DESCRIPTION OF THE FIGURES

Refer to the appended drawings, on which:

FIGS. 1 to 4 show the various steps in the flocking of a seat element with a general parallelepiped shape such as, for example, a seat cushion or a solid headrest.

DETAILED DESCRIPTION OF THE INVENTION

Figure 5:
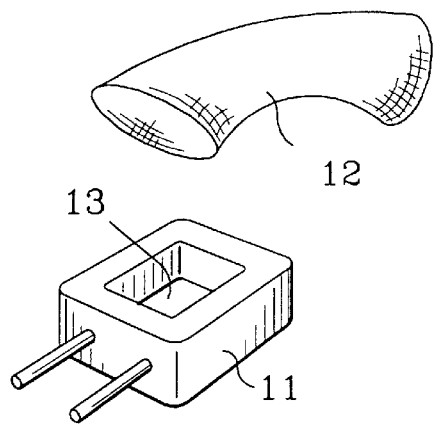
FIGS. 5 to 8 show a first method for positioning the textile web for flocking an open headrest.

FIG. 1, shows a block of foam 1, for example polyurethane foam, comprising the body of the manufactured part, and a piece of textile web 2. The web 2 is positioned, slightly stretched, over the block 1. A retaining frame 3 with dimensions corresponding to those of the contour of the block is then placed over the web and the frame is pushed around the block 1 so as to apply the web with a certain tension, as shown on FIG. 2. Thanks to the flexibility of the web and its deformability it is applied to the surface of the block in a uniform manner without forming folds. The frame 3 can be held in the position shown simply by wedging it around the block or by related mechanical retaining means, not shown.

A conductive adhesive 4 is then applied, as shown on FIG. 3, by spraying with a spray gun 5. The adhesive is therefore applied to the web but also infiltrates the web to adhere to the surface of the block.

The flocking is then performed, in a known manner, by projecting the flock fibres 6 onto the surface previously coated with adhesive, by means of an electrostatic field created between the flock distributor 7 and the conductive adhesive film.

When the flocking has been completed and the adhesive has set, the frame 3 is removed and the excess web can be cut off around the contour or folded over under the back of the part.

To prevent the frame 3 from being bonded to the part and also flocked, the frame will be previously coated with a protective coat and also this frame will be made from a non-conductive material to prevent the flock from also adhering to it.

In the two following examples, adhesive application and flocking are achieved in a manner similar to that described above. Therefore, only a description of the installation and the retaining of the web and the means used for this purpose will be described.

Figure 6:
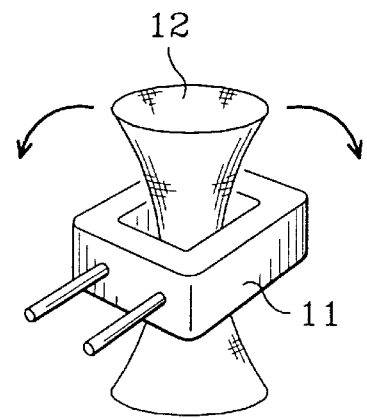
Figure 7:
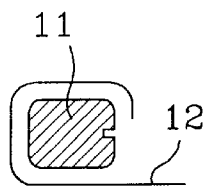
Figure 7:
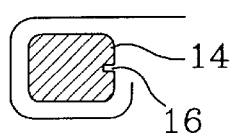
Figure 8:
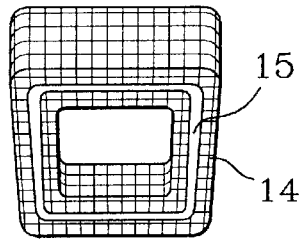

FIG. 5 schematically represents an open headrest 11. The textile web, used in this case, is in the form of a tubular web 12. This web is inserted into the hole 13 of the headrest then stretched and folded over around the headrest as can be seen on FIGS. 6 and 7, this being possible thanks to the high deformability of the web. Due to its elasticity, the web can be perfectly applied to all the inside and outside faces of the headrest. The web is then secured on the back face 14 of the headrest, as shown on FIG. 8, for example, by a strip 15 wedged into a groove 16 made for this purpose in the said back face 14.

Figure 9:
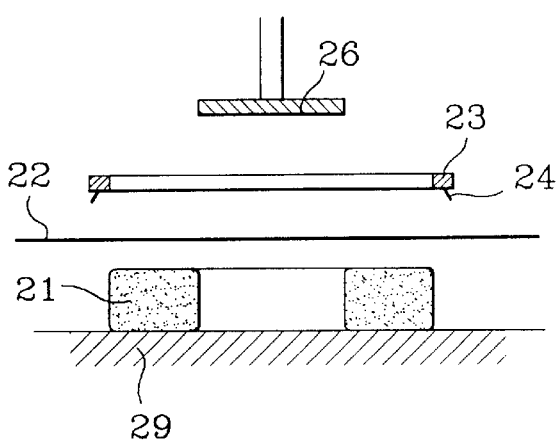
FIGS. 9 and 10 show a second method usable for the flocking of such a headrest or a part with a hollow form.
Figure 10:
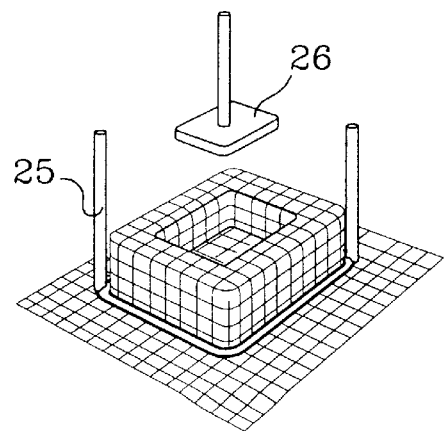

FIGS. 9 and 10 show another method for securing the web on an open part 21. In this variant, the part 21 is placed on a support 29. To secure the web around the part, a frame 23 equipped with studs 24 which grip the web $\lambda 2$, which is here a flat web as in the design shown on FIGS. 1 to 4, the frame 23 being pushed around the part 21, then held pressed against the support 29, as shown on FIG. 10, by push rods 25. The web could also be prestretched over the frame and held in place by studs 24. Also, a punch 26 with dimensions corresponding to those of the centre hole of the part is used to push the web into this hole so as to apply it against the walls of the said hole. Adhesive application and flocking are then performed as described previously.

The invention is in no way limited to the flocking process methods or to the flocked objects which are described above only as examples. In particular, flocking according to the invention could also be used not only for any part or any portion of a part with flat or convex surfaces but also on concave surfaces provided that the specific forms of such surfaces enable the textile web to be applied and held in place during the adhesive application and flocking operations.

What is claimed is:

1. A flocked structure, comprising:
   a three dimensional contoured base;
   a stretchable knitted textile web wrapped around the contoured surface of the base;
   an adhesive film infiltrating the web and covering the contoured base surface to retain the web in adhering intimate contact with the contoured base surface; and
   a coating of flock covering and adhering to the surfaces of the web and the adhesive film.

2. The flocked structure of claim 1 wherein the web is made of a synthetic material.

3. The flocked structure of claim 1 wherein the base is made of synthetic foam.

* * * * *